Dec. 27, 1949        A. S. KESTER        2,492,225
CONTAINER WITH PRESSURE VALVE
Filed Jan. 26, 1945
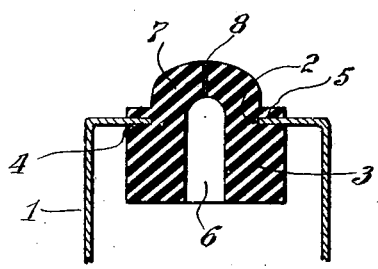
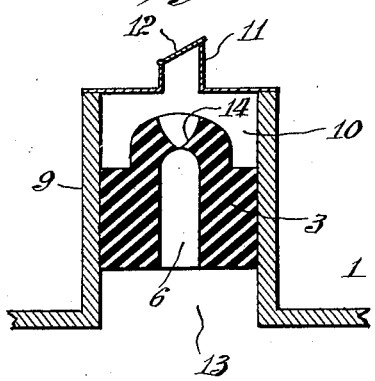
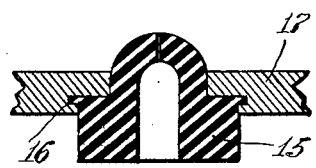
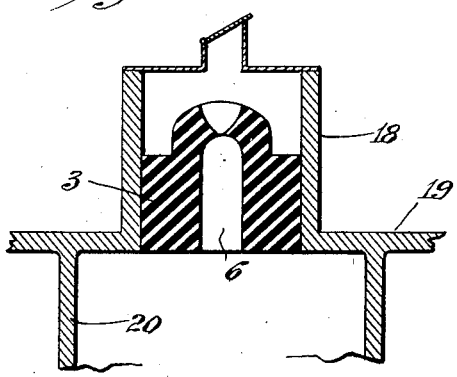
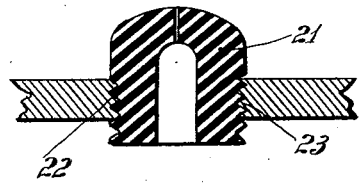
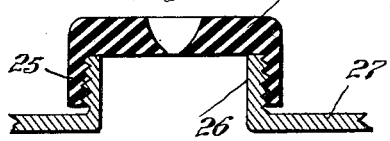
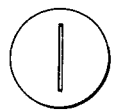 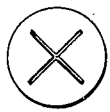 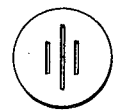
INVENTOR
*Arthur S. Kester*
BY *Paul Kolisch*
ATTORNEY Patented Dec. 27, 1949

2,492,225

UNITED STATES PATENT OFFICE 2,492,225

CONTAINER WITH PRESSURE VALVE

Arthur S. Kester, Chicago, Ill., assignor to The Rauland Corporation, Chicago, Ill., a corporation of Illinois Application January 26, 1945, Serial No. 574,787

2 Claims. (Cl. 220—44)

My invention relates to improvements in, or relating to, pressure-exposed containers and especially to an enclosure containing a medium capable of exerting different pressures upon its wall.

Such enclosures must be either built to withstand maximum pressure or an outlet must be provided to relieve pressure.

In the first instance, the wall thickness and the weight of the enclosure will have to be increased; this is impractical especially in the case of portable and relatively inexpensive enclosures such as battery containers. Plate batteries are very heavy in themselves; they do not permit a further increase in weight. A container for such plate batteries should be as light as possible and capable to withstand the pressure of the acid gases that develop during the operation of the battery.

Automatic valves to relieve the excess pressure are expensive, add weight to the battery, and must be made of special material to withstand the corrosive influence of the acid and of leakage current.

It is the object of my invention to provide an enclosure which, without any increase in wall thickness or weight, permits an effective and quick escape for excess pressure.

According to my invention the enclosure is provided with an elastic wall portion, e. g. of natural or synthetic rubber. Through this rubber piece a fine slit is cut which is normally closed so as to prevent impurities from entering the enclosure. It opens, however, when the pressure exerted by the liquids, or by the development of gases and vapors, within the enclosure exceeds a predetermined value.

The elastic wall portion can be made an integral part of the otherwise non-elastic wall and be molded therein.

Another object of the invention is to provide a stopper having one or more slits made and fitting or above a hole in the wall of an enclosure.

The stopper can be attached to the wall by having recesses fitting over corresponding protrusions of the wall.

If required, the stopper can be glued to the wall by means of an adhesive or screwed into or over an extension of the wall by means of an external or internal thread provided on stopper and extension.

The stopper is preferably of cylindrical shape but it may be of conical or any other desired shape. The slit is cut through the axis of the cylinder. This cut need not necessarily be of uniform width throughout the depth of the stopper but may have a varying cross section, preferably one narrowing from the outside of the wall to its inside. This produces a cut of triangular or trapezoidal shape.

Instead of one slit, several, and preferably parallel, slits can be arranged, if necessary, of different lengths, different depths, and different cross sections to be responsive to different pressures inside the wall.

A greater sensitivity—without much weakening of the stopper structure—in the response to pressure can be obtained by reducing the stopper thickness at the point where the slit is cut through the stopper. This will reduce the depth of the slit which will effectively operate under relatively small increases of pressure without losing flexibility in the course of a great number of operations.

These and other objects of my invention are diagrammatically illustrated in the accompanying drawings, in which:

Fig. 1 shows a wall section of a battery container having an aperture with an elastic stopper or plug overlapping the aperture;

Fig. 2 shows a modified container having a stopper plugged into a tubular extension of the wall of a container;

Fig. 3 represents a modification of Fig. 1;

Fig. 4 is a modification of Fig. 2;

Fig. 5 shows a stopper screwed into a wall portion of a container;

Fig. 6 shows a stopper screwed over a tubular extension in a container wall;

Fig. 7 shows a top view of a cylindrical stopper having one radial slit cut therethrough;

Fig. 8 shows a modification of Fig. 7 having two perpendicular radial slits; and Fig. 9 shows a further modification of Fig. 7 having three parallel slits cut to varying lengths.

In Fig. 1, I represents a cross section through a wall portion of a suitable plastic housing for a battery. This wall portion has a second aperture 2. A stopper 3 made of neoprene is formed to fit into this aperture with recess portions 4 and 5. These portions form cylindrical projections which serve to hold the stopper 3 in place and to make the aperture airtight.

An axial bore 6 extends from the inner end of the stopper close to its outer end leaving a reduced wall 7, through which—perpendicular to the plane of the drawing—slit 8 is cut.

Fig. 2 shows a similarly shaped stopper 3 which is inserted into tubular extension 9 of a container wall 1. A simple compression may be sufficient to position stopper 3 within tube 9, but if required, an adhesive may be used. The tubular portion 10 above stopper 3 is closed by another and smaller tubular portion 11 which ends in a cover plate 12. This cover plate does not represent an airtight closure but serves to protect the stopper 3 from mechanical or atmospheric impulses.

The lower tubular space 13 extending into the inside of the container serves to prevent the accumulation of battery acid on the bottom side of stopper 3 in case the container is tilted.

The slit is cut perpendicular to the plane of the drawing and its triangular or trapezoidal form is visible at 14.

In Fig. 3, the stopper 15 is held on the annular ridge 16 in a corresponding annular groove of wall 17.

In Fig. 4 a stopper 3 is inserted into a tubular extension 18 formed on the outside of the container wall 19 of a battery. On its inside another co-axial tubular extension 20 is formed affording a space which keeps the acid of the battery from collecting on the back of stopper 3 when the container is tilted.

Fig. 5 shows a stopper 21 screwed by means of an outer thread 22 into a corresponding thread of container wall 23.

Fig. 6 shows a stopper 24 having an inner thread 25 fitting over a tubular extension 26 formed in a container wall 27.

Instead of making the entire stopper of elastic material, only a relatively small portion thereof, preferably a central portion surrounding the slit or slits, may be made of elastic material which is inserted, mounted, screwed, or otherwise attached to a relatively nonelastic cup-shaped member. Such a member may be made of plastic or any other suitable material and it may be formed, screwed, fixed or otherwise attached over or into an opening in a container wall.

The invention is not limited to battery containers but may also be applied to all types of containers subject to different inside pressures.

The pressure can be caused by any type of medium: liquids, vapors, gases, or a mixture of liquids, gases, and vapors.

The liquid producing the pressure can have any viscosity. Also the enclosure wall can be made of flexible material without exceeding the scope of this invention.

A particularly useful application is found in providing a closure, according to my invention, for a tin tube containing a paste or cream. The compression of this tin tube exerts pressure on the viscous liquid which, in turn, forces the elastic wall portion to release the liquid.

This leads to the construction of a permanent enclosure cap which opens automatically when pressure is applied from the outside to the flexible enclosure wall.

The new cap can be attached by means of an inner thread such as shown in Fig. 6. This has the advantage that the cap can be easily assembled and removed for cleaning purposes, and can be applied to existing tin tubes and tube models.

If required, the cap can also be formed as part of the relatively rigid top portion of a paste tube without exceeding the scope of my invention.

What I claim is:

1. An enclosure for a medium capable of exerting different pressures and having relatively nonelastic walls comprising, a tubular extension formed integrally with one of the walls, a second smaller tubular extension having an access hole to the atmosphere formed out of the top wall of the first extension, a cap for covering said access hole, an elastic stopper having a trapezoidal shaped slit mounted under pressure and lying completely within the area enclosed by the first extension, said slot narrowing from the outside towards the inside of the stopper, the top of said stopper being recessed around the slit to form a reservoir below the level of the slit.

2. An enclosure for a medium capable of exerting different pressures and having relatively nonelastic walls comprising a tubular extension formed integrally with one of the walls and having an access hole open to the atmosphere, an elastic stopper mounted under pressure and having a centrally positioned slit in axial alignment with said access hole, said stopper lying completely within the area enclosed by said tubular extension, the top of said stopper being recessed around the slit to form a reservoir below the level of the slit.

ARTHUR S. KESTER.

REFERENCES CITED

The following references are of record in the file of this patent:

UNITED STATES PATENTS

| Number | Name | Date |
|---|---|---|
| 1,366,298 | Teitelbaum | Jan. 18, 1921 |
| 1,428,399 | Schilling | Sept. 5, 1922 |
| 1,748,682 | Smith | Feb. 25, 1930 |
| 1,825,553 | Smith | Sept. 29, 1931 |
| 1,865,764 | Keenan | July 5, 1932 |
| 1,959,780 | Danziger | May 22, 1934 |

FOREIGN PATENTS

| Number | Country | Date |
|---|---|---|
| 706,854 | France | Apr. 4, 1931 |

Certificate of Correction

Patent No. 2,492,225                                        December 27, 1949

ARTHUR S. KESTER

It is hereby certified that errors appear in the printed specification of the above numbered patent requiring correction as follows:

Column 1, line 42, for "or above" read *in or above*; column 3, line 38, for "cup-shaped" read *cap-shaped*; column 4, line 24, for "slot" read *slit*; and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*